June 2, 1959 E. Q. SYLVESTER Re. 24,655

FORMING RISER OPENINGS

Original Filed June 3, 1952 3 Sheets-Sheet 1

INVENTOR.
Edmund Q. Sylvester
BY
Wm. O. B. Garner
Atty.

FORMING RISER OPENINGS

Original Filed June 3, 1952 3 Sheets-Sheet 2

INVENTOR.
Edmund Q. Sylvester
BY
Chas. O. B. Garner
Atty

June 2, 1959 E. Q. SYLVESTER Re. 24,655

FORMING RISER OPENINGS

Original Filed June 3, 1952 3 Sheets-Sheet 3

INVENTOR.
Edmund Q. Sylvester
BY
Orlin O. B. Garner
Atty.

United States Patent Office

Re. 24,655
Reissued June 2, 1959

24,655

FORMING RISER OPENINGS

Edmund Q. Sylvester, Shaker Heights, Ohio, assignor to Griffin Wheel Company, Chicago, Ill., a corporation of Delaware Original No. 2,765,505, dated October 9, 1956, Serial No. 291,397, June 3, 1952. Application for reissue October 8, 1958, Serial No. 766,644

13 Claims. (Cl. 22—9)

Matter enclosed in heavy brackets [ ] appears in the original patent but forms no part of this reissue specification; matter printed in italics indicates the additions made by reissue.

This invention relates to the art of casting and more particularly to the provision of riser cups within a permanent mold formed, for example, of a refractory material such as graphite.

The present application is a continuation-in-part of my copending application, Serial No. 189,961, filed October 13, 1950, *now Patent No. 2,819,501, issued, January 14, 1958.*

A general object of the invention is to provide readily replaceable riser cups which may be quickly and economically formed within riser openings of a permanent mold.

Another object of the invention is to provide a riser cup which will prevent coaction between the mold and the cast material within a riser opening of the mold, thereby avoiding undesirable results of such coaction as, for example, explosions caused by reaction of molten steel within a graphite mold.

Another object of the invention is to form a riser cup having a surface closing the inner end of the cup and forming a part of the mold surface which defines the casting cavity therein.

A further object of the invention is to utilize residual heat of the mold to bake the riser cup which may be formed of any conventional core mixture, preferably a mixture using a dry binder.

Still another object of the invention is to bake the inner surface of the riser cup by a heater having a pattern surface complementary to and mated with the mold surface around the riser opening.

Yet another object of the invention is to simultaneously provide a plurality of such riser cups within spaced riser opening of the cope section of a mold.

The foregoing and other objects and advantages of the invention will become apparent from a consideration of the following specification and the accompanying drawings, wherein.

Describing the invention in detail and referring first to

Figures 1 to 6, the mold illustrated therein comprises a composite top or cope section, which is generally designated 2 in Figures 1 to 5, and is provided with a trunnion 3 at each side thereof for convenient handling as by a crane or hoist (not shown). The mold also comprises a bottom or drag section 4, which is preferably of the form disclosed in my above mentioned copending application.

Figure 1:
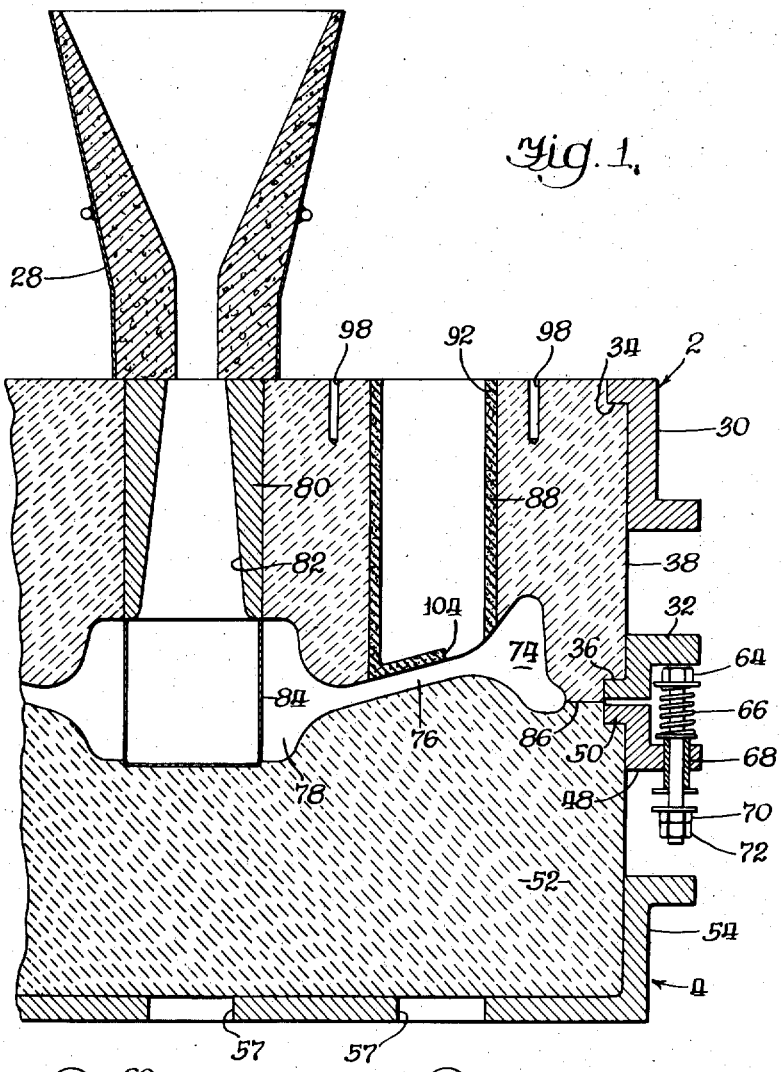
Figure 1 is a fragmentary vertical sectional view of a mold containing a riser cup formed therein according to the invention.
Figure 2:
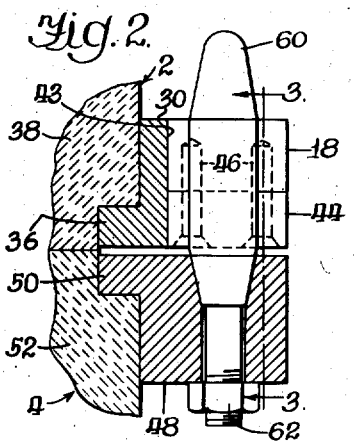
Figure 2 is a fragmentary vertical sectional view through one of the aligning pins for maintaining the cope and drag in mated relationship.
Figure 3:
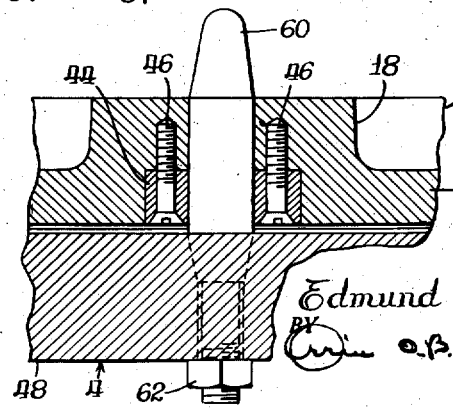
Figure 3 is a sectional view on the line 3—3 of Figure 2.
Figure 5:
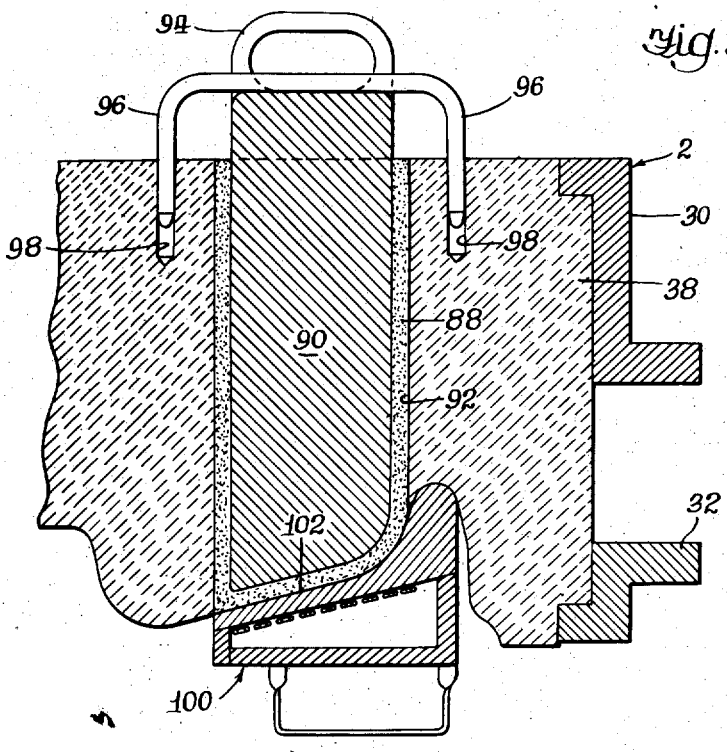
Figure 5 is an enlarged fragmentary vertical sectional view of the cope illustrating the formation therein of a riser cup.
Figure 4:
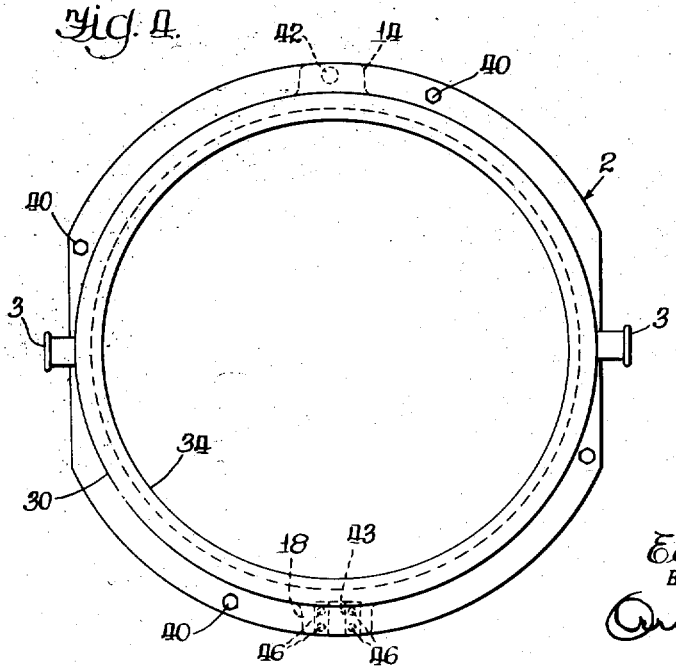
Figure 4 is a reduced top plan view of the cope with the graphite block removed therefrom.
Figure 6:
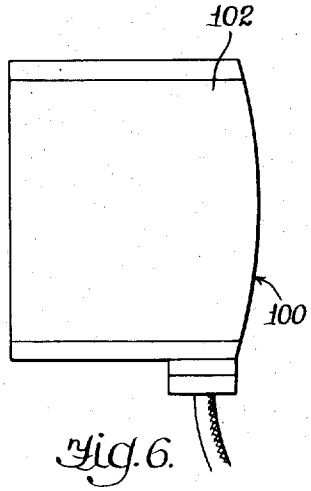
Figure 6 is a plan view of the riser cup heater shown in Figure 5.

As best seen in Figures 1 and 5, the cope 2 comprises top and bottom annular rings 30 and 32 having annular flanges 34 and 36, respectively, seated against top and bottom shoulders of an annular graphite block 38. Rings 30 and 32 are clamped together by bolt and nut assemblies (not shown), as described in my copending application, and the ring 32 is formed with the above mentioned trunnions 3 and is also provided with lugs 14 and 18. Lug 14 is provided with a precision machine ground bushing 42, as best seen in Figure 4 and the lug 18 is provided with a machined slot 43, as best seen in Figures 2 to 4. The slot 43 is defined in part by spaced steel bars 44, secured as by screws 46 to the ring 32. The bushing 42 and slot 43 are diametrically opposed to each other and are preferably arranged so that a vertical plane bisecting them is approximately perpendicular to the axis of the coaxial trunnions 3. The drag 4, as illustrated in Figure 1, comprises a top ring 48 having a flange 50 seated against a complementary shoulder of a graphite block 52, the bottom of which is supported in a complementary cylindrical tray 54, which is preferably perforated as at 57.

The ring 48 is removably secured to the tray 54 by bolts (not shown), as described in detail in my said copending application, and the ring 48, as illustrated in Figures 2 and 3, is provided with a pair of pins 60, each being removably bolted thereto, as at 62 and adapted for reception within the bushing 42 and slot 43, respectively, to mate the cope and drag in precise alignment. It will be noted that the pin 60, associated with the slot 43, is illustrated in Figures 2 and 3; and another substantially identical pin (not shown) carried by the drag ring 48 is received within the bushing 42.

The ring 48, as best seen in Figure 1, also may comprise a plurality of resiliently actuated plungers 64, each of which is supported by a compression spring 66, supported by a bushing 68, threaded in a complementary opening through the ring 48. The spring 66 is adjustably compressed by a nut 70 and a lock nut 72, and the vertical position of the plungers 64 is adjustable by the threaded bushing 68. The plungers 64 support all or a predetermined part of the weight of the cope 2 to facilitate contraction of the wheel casting in the mold cavity, as hereinafter described.

The graphite blocks 38 and 52 are preferably machined on their mating surfaces to define a mold cavity corresponding to the shape of a standard A.A.R. wheel, said cavity comprising a rim section 74, a plate section 76, and a hub section 78 for the corresponding parts of a steel wheel to be cast therein, as hereinafter described.

The graphite block 38 of the cope 2 is also provided with a readily removable graphite sleeve 80 (Figure 1) which may, if desired, be secured in any convenient manner, as by a suitable cement, within a complementary hole or opening of the block 38, said sleeve having a gate opening 82 tapering upwardly to communicate with the pouring cup 28. Beneath the gate opening 80 is a fusible, preferably metallic anti-splash cup 84 which, in the illustrated embodiment shown in Figure 1, is formed of thin sheet steel. The anti-splash cup 84 is inserted into the cope cavity 78, prior to assembly of the sleeve 80; and the bottom of the cup 84 is seated on the block 52. The cup 84 is adapted to receive the molten metal from the gate 82, and after the molten metal has filled the cup 84, the latter melts providing a pool of molten metal beneath the gate 82 so that additional molten metal flowing therefrom into the mold cavity does not splash but flows smoothly into the pool which enlarges until the casting cavity is filled with molten metal. This novel arrangement prevents splashing of the molten metal and also prevents rapid erosion and pitting of the graphite surfaces defining the mold cavity, a difficulty which has heretofore rendered maintenance of such molds unduly expensive for the production of large steel castings such as railway wheels.

It may be noted that some erosion of the graphite surfaces defining the mold cavity occurs even with the present arrangement, and I have discovered that by arranging the mold parts as above described, these surfaces and the mating surfaces 86 of the graphite blocks 38 and 52 around the periphery of the mold cavity may be machined to remove an increment of, for example, 1/32 of an inch, thereby quickly and economically renewing the mold cavity.

The graphite block 38 of the cope 2 comprises one or more riser cups or sleeves 88 communicating with the plate section 76 of the mold cavity radially inwardly of the rim section 74, and it has been discovered, according to the present invention, that the location of these cups 88 is extremely important, preventing distortion of the wheel casting during shrinkage of the cooling steel in the mold cavity. In this connection, it has been discovered that the prior art practice of connecting risers to the rim section of the mold cavity prevents uniform contraction of the cooling wheel casting and causes non-round wheel tread surfaces.

The riser cup 88, as best seen in Figure 5 is a generally cylindrical gas permeable, noninflammable member formed, for example, of any desired flowable thermosetting material, such as a mixture of core sand and dry binder baked, as hereinafter described, to provide a strong smooth cup 88, the walls of which vent gas caused by coaction of the molten metal and graphite.

The cup 88 is formed by inserting a plug 90, of aluminum or any other suitable material, into an opening 92 in the graphite block 38. The plug 90 is provided with a handle 94 secured to a pair of guides 96 which are adapted for reception within complementary openings 98 in the block 38 to center the plug 90 within the opening 92. An electric heater, generally designated 100, is positioned at the bottom of the opening 92, said heater having a top pattern surface 102 preferably formed of aluminum and corresponding to the shape of the mold cavity across the bottom of the opening 92. Thus, the surface 102 of the heater 100 closes the bottom of the opening 92 along a contour corresponding to the contour of the wheel to be cast in the mold cavity.

With the heater 100 and plug 90 in position, as shown in Figure 5, any suitable mixture such as, for example, a mixture of silica sand and about 2% dry phenol formaldehyde binder is poured into the opening 92 around the plug 90 until the opening is entirely filled as shown in Figure 5. The mixture is then baked by the heater 100 and by the residual heat in the graphite block 38 from the casting which has just been removed therefrom. In the case of an initial casting, the block 38 is baked in a furnace and the heater 100 is simultaneously energized to bake the mixture until it solidifies.

After the mixture has been baked sufficiently to solidify the riser cup 88, the heater 100 and plug 90 are removed, and a hole or opening 104 (Figure 1) is drilled in the bottom of the riser cup 88 at a point radially inwardly of the rim section 74 of the mold cavity. If desired, either the surface of plug 90 or the heater surface 102 may be provided with a dowel or projection corresponding to the shape of the opening 102 and bearing against the other sufrace to avoid the necessity of drilling the hole 104.

It may also be noted that preferably the plug 90 and heater surface 102 are coated with a suitable parting medium such as acetylene black to prevent sticking of the binder.

Figure 7:
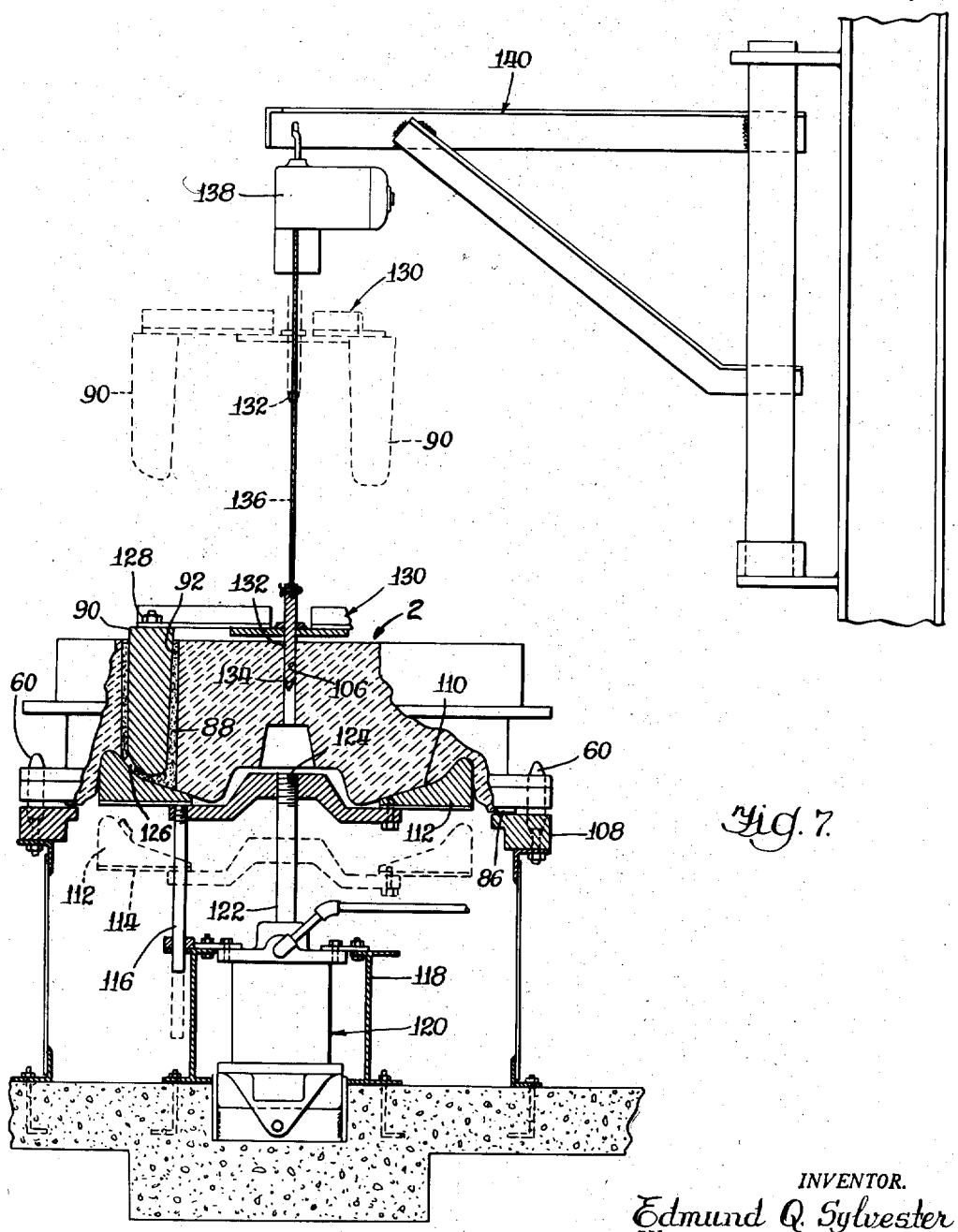
Figure 7 is a side elevational view partly in vertical section of a cope and apparatus for forming a plurality of riser cups simultaneously therein.

Referring now to Figure 7, parts corresponding to those of Figures 1 to 6 are identified by corresponding numerals. The cope mold section 2, illustrated in Figure 7, is particularly adapted for a pressure pouring system wherein the gate is in the drag section (not shown) and for this reason, the center of the cope is provided with a substantially vertical cylindrical opening 106 centrally thereof and serving a purpose hereinafter described.

The surface 86 of the cope 2 is adapted for support on a resting or support ring 108 to which the aligning pins 60 are attached to maintain the downwardly facing casting surface of the mold in precise alignment with a pattern surface 110 of an annular heating plate 112, said surface 110 corresponding precisely in contour to the plate and rim sections of a wheel to be cast against the downwardly facing surface of the cope 2 which defines the casting cavity, as heretofore discussed in connection with the previous embodiment.

The plate 112 is anchored to a support or cross head 114 guided by one or more rods 116 which are slidably fitted within complementary guide openings of a frame 118. The frame supports a conventional power cylinder device generally designated 120, the piston rod 122 of which is afforded a threaded connection at 124 to a central opening of the support 114 in vertical alignment with the central opening 106 of the cope 2. The support 114 is illustrated in phantom lines in retracted position in Figure 7, under which conditions the cope surface 86 is supported against the resting ring 108; and the support 114 is illustrated in solid lines in advance position whereat the heating plate 112 supports the weight of the cope 2 with the pattern surface 110 of the plate 112 mated with the corresponding casting surface of the cope 2.

The cope 2 is provided with a plurality of riser openings 92, preferably three in number spaced equi-distantly from each other and from the central opening 106; and the heating plate 112 comprises projections 126 received within the respective openings 92 when the plate 112 is in the advance position illustrated in Figure 7, each projection or lug 126 having an arcuate face corresponding to and adapted to mate with the bottom surface of the related plug 90 at the radially outermost point of said bottom surface.

The plugs 90 corresponding in number to the riser openings 92 of the core 2 are removably anchored as at 128 to a holder 130 having a depending cylindrical pin 132 complementary to and adapted for reception within the opening 106 of the cope 2 to facilitate alignment of the plugs 90 with the riser openings 92, as hereinafter described. The lower end of the projection 132 is tapered as at 134 to facilitate entrance to the opening 106. The holder 130 is supported centrally thereof by a chain 136 adapted to be raised and lowered by a conventional hoist 138 of a jib crane generally designated 140.

Thus the holder 130 and plugs 90 may be retracted to a position illustrated in phantom lines in Figure 7 and may be advanced to a position illustrated by solid lines in that figure.

The apparatus illustrated in Figure 7 is utilized to form riser cups 88 within the cope 2 in the following manner. The cope 2 is positioned with its surfaces 86 supported by the ring 108 and with the pins 60 received within the bushing 42 and slot 43 (not shown) of the cope 2, thereby positioning the downwardly facing casting surface of the cope 2 in precise alignment with the pattern surface 110 of the heating plate 112. It will be understood that, under these conditions, the cope 2 has been heated either by formation of a casting therein or by baking in an oven to a suitable temperature for baking a core mixture, as previously described in connection with Figures 1 to 6. Also the plugs 90 and the surface 110 have been coated with a parting medium, such as an acetylene black which may be conveniently applied by directing the flame of an acetylene torch against the exterior surface of the plug 90.

The hoist 138 is then actuated to lower the aligning projection or pin 132 into the central opening 136 of the cope, as the plugs 90 are lowered into the riser openings 92. Either before or after lowering of the plugs 90, the power cylinder device 120 is actuated to urge the heating plate 112 upwardly until the pattern surface 110 thereof mates with the corresponding surface of the cope 2, whereupon the plate 112 supports the cope above the ring 108, as illustrated in Figure 7. Under these conditions, the projections 126 of the heating plate 112 are mated along the upwardly facing arcuate surfaces thereof with the complementary surfaces of the respective plugs 90, whereby the projections 126 and the pin 132 are effective to position the plugs 90 centrally within the openings 92.

Under these conditions, the core mixture described in connection with Figures 1 to 6, is poured into the opening 92 around the block whereupon the heat of the cope 2 is effective to bake the core mixture into a riser cup 88 having an opening in the bottom thereof corresponding to the projection 126. It may be noted that, if desired, the plate 112 may be heated by any conventional means, such as described in connection with heater 100 of the previously discussed embodiment. However, it has been found that if this plate is formed of a good heat conductor such as iron, the heat of the cope 2 conducted along the pattern surface 110 of the plate 112, is effective to bake the bottom surface of the cups 88. Or if desired, the plate 112 may be preheated.

After the cup 88 has been sufficiently baked, the hoist 138 is actuated to lift the chain 136, thereby elevating the plugs 90 from the openings 92, whereupon, if desired, a small amount of the core mixture may be poured into the cup 88, which may be baked for an additional length of time with the added core mixture therein to increase the thickness of the bottom wall of the cup.

Thereafter, the device 120 is actuated to lower the plate 112 to the retracted position illustrated at phantom lines in Figure 7, whereupon the opening in the bottom of the cup 88 corresponding to the projection 126, may if desired, be cleaned out by inverting the cope 2 and passing a small rod through this opening to dislodge any loose sand therefrom.

I claim:

1. A method of forming a riser cup within a riser opening of a refractory mold section having a downwardly facing surface partly defining an annular casting cavity including a hub section connected by a relatively thin plate section to a rim section of said cavity along an arcuate area of said surface joining said plate section to said rim section; said method comprising closing the bottom of said opening by a pattern corresponding to the contour of said area and inserting a plug in said opening spaced from said mold section and from said pattern to define a cup shaped cavity in said opening around and below said plug, then filling said cavity by pouring into the top thereof a flowable material adapted to harden upon baking and then baking said material by residual heat in the mold section by a casting previously removed therefrom and by simultaneously heating said pattern, and then after said material has hardened, removing said pattern and plug from said mold section.

2. A method of forming a riser cup within a riser opening of a refractory mold section having a downwardly facing surface partly defining an annular casting cavity including a hub section connected by a relatively thin plate section to a rim section of said cavity along an arcuate area of said surface joining said plate section to said rim section; said method comprising heating the mold section to a certain temperature value, then closing the bottom of said opening by a pattern corresponding to the contour of said area and inserting a plug into said opening spaced from said mold section and from said pattern to define a cup shaped cavity in said opening around and below said plug, whereby the bottom of said cavity is defined by said pattern, then filling said cavity by pouring into the top thereof a flowable material adapted to harden upon baking at said temperature value while heating said pattern and before said mold section has cooled below said value, and then after said material has hardened, removing said pattern and plug from said mold section.

3. A method, according to claim 2, wherein the material is heated by residual heat in the mold section from preheating thereof prior to insertion of the plug in the opening.

4. A method, according to claim 2, wherein the pattern is provided with an upwardly tapering projection seated against the plug when the latter is positioned within the opening.

5. A method, according to claim 2, wherein an opening is formed in the inner end of the riser cup after the plug and pattern have been removed from the mold.

6. A method of forming a riser cup within a riser opening in a refractory mold section having a downwardly facing surface partly defining an annular casting cavity; said method comprising heating the entire mold section to a certain temperature value, then mounting the mold section on a support above a pattern corresponding to the contour of said surface, then raising said pattern to engage said surface and thereby lift said mold section from said support and inserting into said opening a plug spaced from said mold section and from said pattern to define a cup shaped cavity in said opening around said plug and between the plug and pattern, then filling said cavity by pouring into the top thereof, flowable material adapted to harden upon baking at said temperature value before said mold section has cooled below said value, and while heating said pattern to at least said value and then after said material has hardened, removing the plug from the opening and lowering the pattern to return the mold section to said support.

7. A method of forming a riser cup within a riser opening of a refractory mold section having a downwardly facing surface partly defining an annular casting cavity including a hub section connected by a relatively thin plate section to a rim section of said cavity along an arcuate area of said surface joining said plate section to said rim section; said method comprising heating the mold section to a certain temperature value, then supporting the mold section above and spaced from a pattern corresponding to the contour of said area, then raising the pattern to engage said area and thereby lift said mold section from its support and inserting into said opening a plug spaced from said mold section and from said pattern to define a cup shaped cavity around the plug and between the plug and pattern, then filling said cavity by pouring into the top thereof and around said plug a flowable material adapted to harden upon baking at said temperature value before said mold section has cooled below said temperature value and while heating the pattern to at least said temperature value, and then after said material has hardened, removing the plug from the opening and lowering the pattern to return the mold section to said support.

8. Apparatus for forming a riser cup in an opening of a mold having a casting surface intersected by the inner ends of riser openings, said apparatus comprising a holder having a pin receivable within a complementary opening of the mold, a plurality of plugs anchored to said holder and loosely receivable within respective openings, means for raising and lowering the holder, a member with a pattern underlying said casting surface, means for raising the pattern into complementary engagement with the casting surface and for lowering the pattern to a position out of engagement with the casting surface, and a support for holding said mold above the level of said pattern when the latter is lowered to said position.

9. Apparatus, according to claim 8, wherein the support and mold are provided with means for maintaining the casting surface against horizontal or rotational displacement on a vertical axis from alignment with respect to the pattern, and other means are provided for maintaining the pattern against rotational movement on said vertical axis.

*10. A method of forming a riser cup within a riser opening in a refractory mold section having a downwardly facing surface partly defining a casting cavity; said method comprising heating the entire mold section to a certain temperature value, then mounting the mold section on a support above a pattern corresponding to the contour of said surface, then raising said pattern to engage said surface and thereby lift said mold section from said support and inserting into said opening a plug spaced from said mold section and from said pattern to define a cup shaped cavity in said opening around said plug and between the plug and pattern, then filling said cavity by pouring into the top thereof, flowable material adapted to harden upon baking at said temperature value before said mold section has cooled below said value, and then after said material has hardened, removing the plug from the opening and lowering the pattern to return the mold section to said support.*

*11. A method of forming a riser cup within a riser opening of a refractory mold section having a downwardly facing surface partly defining a casting cavity; said method comprising heating the mold section to a certain temperature value, then supporting the mold section above and spaced from a pattern corresponding to the contour of said surface, then raising the pattern to engage said surface and thereby lift said mold section from its support and inserting into said opening a plug spaced from said mold section and from said pattern to define a cup shaped cavity around the plug and between the plug and pattern, then filling said cavity by pouring into the top thereof and around said plug a flowable material adapted to harden upon baking at said temperature value before said mold section has cooled below said temperature value and then after said material has hardened, removing the plug from the opening and lowering the pattern to return the mold section to said support.*

*12. In a method of forming a riser cup in a riser opening of a mold having a casting cavity communicating with said opening, the steps of heating the mold to a certain temperature value, closing the end of the opening which communicates with said cavity, inserting a plug into said cavity spaced from the perimeter thereof, and then filling the rest of said opening with a mixture of sand and resin which is thermosetting at said temperature value.*

*13. In a method of forming a riser cup in a riser opening of a mold having a casting cavity communicating with said opening, the steps of heating the mold to a certain temperature value, closing the end of the opening which communicates with said cavity, inserting a plug into said cavity spaced from the perimeter thereof, heating the plug, and then filling the rest of said opening with a mixture of sand and resin which is thermo-setting at said temperature value.*

References Cited in the file of this patent or the original patent

UNITED STATES PATENTS

| | | |
|---|---|---|
| 716,870 | Crecelius | Dec. 30, 1902 |
| 969,015 | Washburn | Aug. 30, 1910 |
| 1,017,970 | Harris | Feb. 20, 1912 |
| 1,461,862 | Clark | July 17, 1923 |
| 1,666,577 | McCabe | Apr. 17, 1928 |
| 2,133,027 | Honig | Oct. 11, 1938 |
| 2,399,606 | Schuh et al. | Apr. 30, 1946 |

OTHER REFERENCES

Modern Metals, October 1950, pages 22–24.